|     | United States Patent [19]                                      | [11]        | 4,358,572       |
|-----|-----------------------------------------------------------------|-------------|---------------------|
|     | Mack et al.                                                     | [45]        | Nov. 9, 1982    |

[54] METHOD FOR THE PREPARATION OF NON-CRYSTALLINE POLYMERS OF HIGH MOLECULAR WEIGHT

[75] Inventors: Mark P. Mack, Ponca City, Okla.; Lewis B. Decker, Jr.; Adrian L. Wallace, both of Lake Charles, La.

[73] Assignee: Conoco Inc., Ponca City, Okla.

[21] Appl. No.: 261,339

[22] Filed: May 7, 1981

[51] Int. Cl.³ .......................... C08F 4/64; C08F 10/14
[52] U.S. Cl. ................. 526/142; 252/8.55 R; 526/348.2; 526/907
[58] Field of Search ......................................... 526/142

[56] References Cited

U.S. PATENT DOCUMENTS 3,116,274 12/1963 Boehm et al. .................. 526/142
3,692,676 9/1972 Culter et al. .................... 526/348.2

FOREIGN PATENT DOCUMENTS 918740 2/1963 United Kingdom ................ 526/142
101977 1/1966 United Kingdom ................ 526/142

*Primary Examiner*—Edward J. Smith
*Attorney, Agent, or Firm*—Cortlan R. Schupbach, Jr.

[57] ABSTRACT

A process for the preparation of a drag reducing substance which comprises:
 (a) a transition metal catalyst slurry containing:
  1. crystalline titanium halide having the general formula TiXn where n=2.5 to 3.0 and X is halogen,
  2. a hydrocarbon diluent, and
  3. an ether;
 (b) a co-catalyst;
 (c) alpha-monoolefinic hydrocarbons containing from 2 to 30 carbon atoms under suitable polymerization conditions providing for an ultrahigh molecular weight polymer that is soluble in hydrocarbons; and
 (d) ceasing the polymerization at a polymer content of 20 percent by weight or less.

9 Claims, 1 Drawing Figure

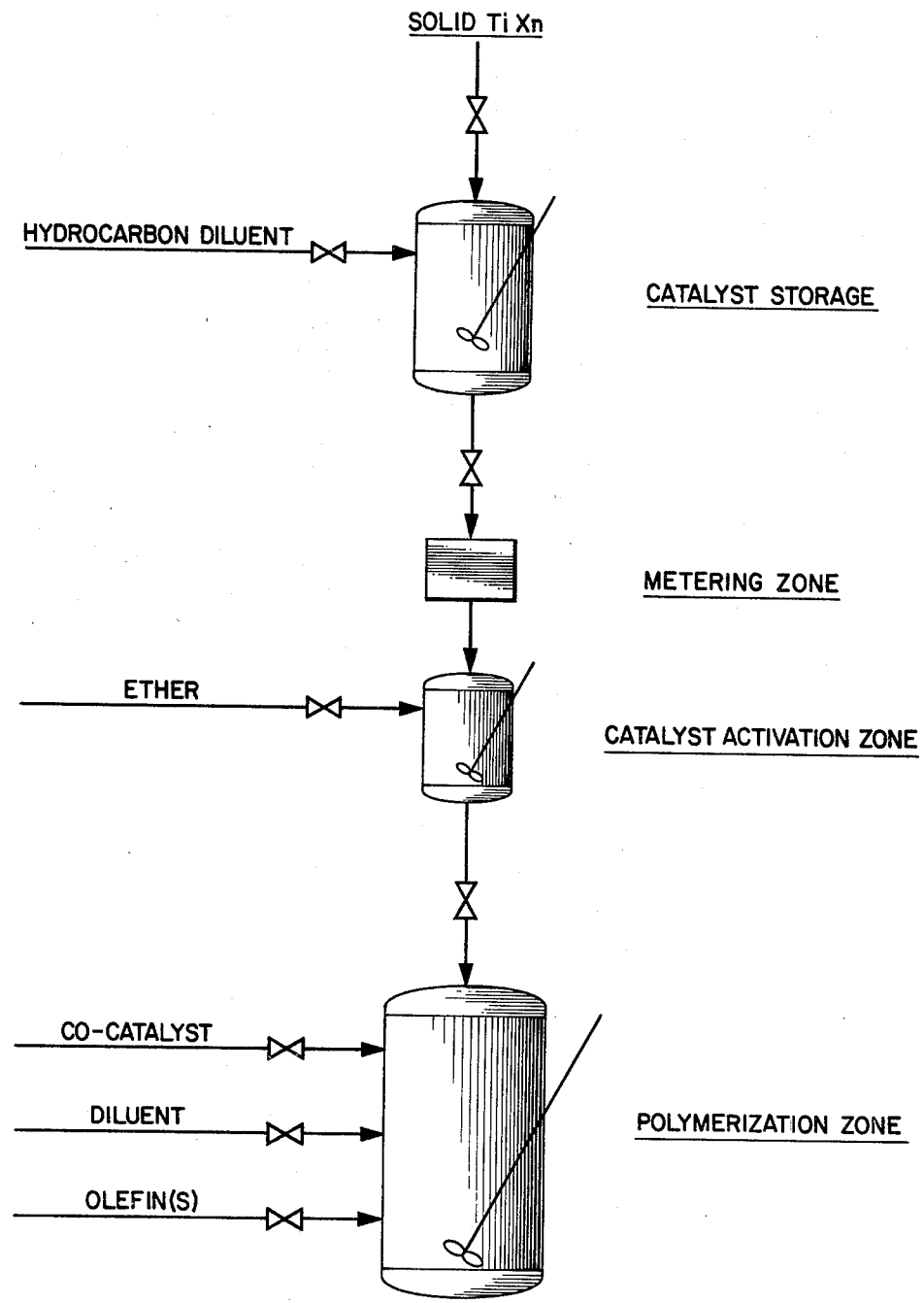

METHOD FOR THE PREPARATION OF NON-CRYSTALLINE POLYMERS OF HIGH MOLECULAR WEIGHT

This invention relates to a method for preparing a high molecular weight, non-crystalline polymers suitable for use as a drag reducing substances. More specifically, this invention relates to an improved method for preparing such materials by slurrying a transition metal catalyst in a hydrocarbon diluent with an ether activator, placing the slurry in the presence of a co-catalyst such as an organo-aluminum compound or organoaluminum halide, and contacting the material with one or more α-monoolefinic hydrocarbons containing from 2 to 30 carbon atoms under suitable polymerization conditions, then ceasing the polymerization at a polymer content of 20 percent by weight or less.

It is well known that α-olefins may be polymerized in the presence of catalysts generally referred to as Ziegler-Natta catalysts. These catalysts generally consist of materials such as a transition metal halide such as titanium trihalide and organometallic co-catalysts such as aluminum alkyls or aluminum alkyl halides.

Much work has been done on modifying Ziegler-Natta catalysts to improve polymerization rates with development of more efficient catalysts or promoters for the production of highly crystalline polypropylene and poly (butene-1). These efforts usually have been two-fold: to maximize catalyst activity and to control polymer stereo-specificity. Among the numerous organic additives proposed for the preparation of polypropylene and poly(butene-1) are those disclosed in U.S. Pat. No. 3,476,730, hereby incorporated by reference in its entirety into the instant specification.

A number of ether modified Ziegler-Natta systems have been proposed as catalysts. A propylene polymerization catalyst was taught in U.S. Pat. No. 3,116,274, which consisted of an aluminum alkyl, a titanium halide, such as titanium tetrachloride, and an ether compound. This reference recommends the use of a halogen-free alkyl as the co-catalyst for the propylene polymerization process and cyclic ether, such as 1,4-dioxane as suitable catalyst promoters.

U.S. Pat. No. 3,206,533 prepared synthetic lubricants by the polymerization of α-olefins containing from 6 to 14 carbon atoms in the presence of aluminum alkyl sesquichloride, titanium tetrachloride, and an oxygen-containing organic component, such as an oxirane or methyl alkyl ether, at temperatures of from 0° to 50° C.

U.S. Pat. No. 3,156,681 revealed an improved process for the polymerization of olefins using an unsaturated ether compound as a catalyst promoter. Suitable unsaturated ethers were taught to be vinyl ethers, with the preferred material being vinyl isobutyl ether. U.S. Pat. No. 3,318,859 discloses a process for the stereospecific polymerization of propylene using a catalyst prepared from monoalkyl aluminum halide, violet titanium trichloride and an ether of the formula $R_1OR_2$, where $R_1$ represents alkyl or aralkyl, and $R_2$ is an alkylaryl, aralkyl, or alkylaryl radical. This reference deals with the preparation of isotactic highly crystalline polypropylene.

However, none of these references whether taken alone or in any combination teach or suggest a method for obtaining an ultrahigh molecular weight polymer which is non-crystalline and has properties suitable for use as a drag reducing material. The references discussed are representative but not exhaustive of the art. The present invention also relates to anti-mist agents, fuel efficiency agents, lubricant components and tackifiers. The process of the present invention produces polymer especially well suitable for fluids being transported through pipelines, and for a method of producing such materials. In the art discussed, the thrust of attempts was to further increase polymerization activity, stereoregularity, and crystallinity by the introduction of catalyst modifiers. These systems all produced highly crystalline, high molecular weight polyα-olefins such as polypropylene or poly(butene-1). The highly crystalline polymers, resulting from such processes, are the result of the orderly arrangement of the pendant substituents along the polymer's chain backbone. These stereoregular, crystalline polymers have excellent physical and mechanical properties, are suitable to form molded objects which exhibit stiffness. For example, these materials can be injection molded and extruded in the forms of objects such as pipe or tubing which require rigidity. One drawback, of the high molecular weight and the ultrahigh molecular weight polymers which are crystalline, are their processing difficulties.

In contrast to these objectives of the prior art, the present invention relates to polymerization of at least one α-monoolefin containing from about 2 to about 30 carbon atoms to produce ultrahigh molecular weight, non-crystalline polymers. These polymers as such are not suitable to form molded objects which exhibit stiffness. In addition, these materials are not suited for molding and the like and cannot be extruded in a form which requires rigidity. Thus, the general purpose of the present invention is to provide an improved method for the preparation of ultrahigh molecular weight, non-crystalline polymers, co-polymers, and ter-polymers, which are hydrocarbon soluble. Ethylene and propylene, are operable and included in the definition of α-olefins for the purposes of the present invention.

U.S. Pat. No. 3,692,676 reveals a method of reducing friction loss or drag for pumpable fluids through pipelines by adding a minor amount of a very high molecular weight polymer. This reference shows that generally from about 5 to about 50 parts per million (ppm) of a poly-α-olefin in the pumpable fluid provides drag reduction, and defined percent drag reduction for oil being passed through a pipeline as $$\% \, DR = \frac{\text{(Pressure Drop of Oil)} - \text{(Pressure Drop of Polymer Solution)}}{\text{(Pressure Drop of Oil)}} \times 100$$

This patent is hereby incorporated in the instant specification in its entirety.

However, the preparation of the ultrahigh molecular weight, non-crystalline materials of the present invention encounters several problems, one of which is the extremely long reaction time necessary in order to obtain a useable product. In order to obtain the ultrahigh molecular weight, non-crystalline and hydrocarbon soluble polymers, it is necessary that the polymerization be conducted at low temperatures resulting in long batch times and low catalytic activities.

It would, therefore, be of great benefit to provide a process which has fast reaction time while providing the high molecular weight, non-crystalline materials of the present invention.

We have now discovered a method for preparing non-crystalline, high-molecular weight, drag reducing polymers which comprises:

(a) preparing a transition metal catalyst slurry containing
 (1) at least 5 percent by weight based on the total slurry weight of a crystalline titanium halide having the general formula $TiX_n$ where $n=2.5$ to 3.0 and X is halogen;
 (2) a hydrocarbon inert diluent; and
 (3) from about 0.01 to about 10.0 moles of an ether per mole of titanium together with
(b) a co-catalyst such as an aluminum alkyl and/or an organo-aluminum halide material, wherein (a) and (b) are placed in contact with:
(c) one or more α-monoolefinic hydrocarbons containing from 2 to 30 carbon atoms under polymerization conditions of from about $-25°$ C. to about $100°$ C. and atmospheric to about 1000 pounds per square inch gauge pressure to obtain an ultrahigh molecular weight polymer, soluble in a hydrocarbon diluent.

Preferably, the polymerization should be ceased at a polymer content of 20 percent by weight or less based on total reactor content.

It is normally preferred that the polymerization be completed or terminated at 20 weight percent or less polymer content, based on total reactor content in order to obtain the ultrahigh molecular weight, non-crystalline hydrocarbon soluble material. The resulting mixture will then contain less than 20 weight percent of the ultrahigh molecular weight polyolefin, a hydrocarbon solvent (or unreacted olefins), deactivated catalyst, and optionally a small amount of alcohol. The entire mixture can then be used as a drag reducing substance. However, the polymer may be precipitated by a variety of techniques if desired. These techniques are well known to those skilled in this art. In addition, materials can be added to prevent deterioration of the mixture or corrosion of its environment. For example, materials such as epoxides (propylene oxide) or compounds containing at least one oxirane unit; primary, secondary, and tertiary amines (such as triethylamine, tributylamine, trioctylamine); polyamines; natural amino acids; and Group I-A and II-A metal hydroxide bases.

If polymerization is allowed to continue to higher levels, the average molecular weight will rapidly decrease making the materials less desirable for use as drag reducing materials. Therefore, it is preferred in the practice of the present invention to cease polymerization at polymer content level ranging from about 5 to about 20 weight percent, again based on total reactor content. However, polymer content levels of from 5 to 15 weight percent are preferred and polymer content levels of from about 8 to about 11 percent are most preferred, all based on the total reactor mixture. In addition, as the weight percent polymer content increases, the bulk viscosity of the mixture increases and it becomes difficult to pump these drag reducing materials.

The catalyst slurry of the present invention comprises a crystalline titanium halide material, a hydrocarbon diluent, and a complexing ether agent. Preferably, the catalyst is titanium trichloride, which is aluminum reduced and activated. Examples of such materials are sold by the Stauffer Chemical Company as $TiCl_3.AA$ Type 1.1 (aluminum reduced and activated, having the formula $TiCl_3.\frac{1}{3}(AlCl_3)$. However, crystalline violet titanium trichloride and titanium catalysts of the formula $TiCl_3.mAlCl_3 (m=0$ to $1.0)$ can generally be used.

The second component of the catalyst slurry is a hydrocarbon diluent. These materials are inactive hydrocarbon solvents with respect to the polymerization. Examples of such materials are straight chain aliphatic compounds or branched hydrocarbons such as ethane, propane, butane, pentane, hexane, heptane or octane. Also suitable are alicyclic hydrocarbons such as cyclohexane, methyl cyclopentane and tetralin. In addition, aromatic hydrocarbons can be used such as benzene, toluene, and xylene. Of course, mixtures and analogues of these compounds can be used such as Molex (trademark of Universal Oil Products) raffinate which is a complex mixture of branched aliphatic, cyclic aliphatic, aromatic, and trace amounts (2-3%) of unbranched aliphatic hydrocarbons. The hydrocarbon diluent can also be an α-olefin.

The titanium complex and ether agent is a very important component of the catalyst slurry. The ethers are selected from alkyl ethers wherein ether oxygen is attached directly to 2-aliphatic groups and may have aromatic substituents; aryl ethers wherein the ether oxygen is attached directly to two aromatic groups; aryl-alkyl ethers wherein the ether oxygen is attached directly to one aliphatic and one aromatic group and cyclic ethers wherein the ether oxygen is an integral part of a ring structure. Thus, the ether can contain alkyl, aryl, aryl-alkyl or aryl-alkyl group, each containing from 1 to 30 carbon atoms, and cycloalkyl ethers containing from 2 to 30 carbon atoms.

Representative, but non-exhaustive examples of alkyl ethers are benzyl ether, n-butyl ether, tert-butyl methyl ether, di-n-butyl ether, isopropyl ether, and di-n-propyl ether. Representative examples of cyclic ethers are cyclododecane epoxide, cyclohexane oxide, cyclooctene oxide, cyclopentene oxide, dibenzofuran, dihydropyran, furan, 2-methylfuran, 5-methylfuran, 2-methyl tetrahydrofuran, 3-methyl tetrahydrofuran, styrene oxide and tetrahydrofuran. Representative examples of aryl ethers are m-phenoxytoluene and phenyl ether. Representative examples of aryl-alkyl ethers are anisole, butyl phenyl ether, m-dimethyloxybenzene, p-dimethoxybenzene, 2,6-dimethoxytoluene, 1-methoxynaphthalene and 2-methoxynaphthalene.

The reaction is normally carried out under an inert atmosphere such as dry nitrogen or dry argon to prevent degradation of the titanium and aluminum alkyl components. The slurry system of the present invention has a number of processing advantages as well as providing an ultrahigh molecular weight, non-crystalline, hydrocarbon soluble, drag reducing polymer. Initially, the system provides a high safety factor, since titanium trichloride is a flammable solid which decomposes readily by moisture and oxygen to titanium dioxide and hydrogen chloride. The fumes are hazardous, and the catalyst can ignite. The slurry system of the present invention makes such materials easier to handle, deliver, and meter into the reactor as compared to the solid catalyst. The slurry limits the catalyst exposure to air and moisture. In addition, the slurry system of the present invention provides uniform distribution of catalyst throughout the reactor, reduces the amount of catalyst agglomeration in the preparation of such highly viscous materials and reduces the product's corrosivity on steel and metal surfaces. These catalyst components are normally highly corrosive, and when agglomerated result in a very corrosive environment.

The ether component of the instant invention activates the titanium catalyst and generates a more effective drag reducer. However, the addition of ether in contact with the titanium component for long periods of time, results in catalyst deactivation and/or retardation of product molecular weight. The simple addition of the ether component into the reactor provides improvement. However, the addition of the ether to the titanium component prior to insertion into the reactor according to the present invention further improves activity and performance. In a preferred embodiment set forth in FIG. 1, the titanium component of the present invention is mixed with a hydrocarbon diluent and agitated. This material is then sent to a metering zone wherein materials are passed to a catalyst activation zone where they are contacted with ether and activated. This contact time will generally range up to about 10 minutes, but in any case must be sufficient to activate the titanium material. It is imperative that this activation be carried out under an inert atmosphere and with sufficient agitation to ensure activation. The catalyst activation zone is normally large enough to contain catalyst for several batches. In a more general embodiment the titanium catalyst and ether activator are simply mixed batch-wise for each polymerization carried out.

The ether activated titanium component is then charged into a polymerization zone wherein it is contacted with organoaluminum co-catalysts, olefin, and an optional inert hydrocarbon diluent. Under these conditions a very rapid reaction occurs which reduces catalyst agglomeration and which provides a very high molecular weight, non-crystalline, hydrocarbon soluble, drag reducing polymer.

FIG. 1 is a general description of a preferred embodiment of a catalyst slurry activation system.

Specifically described, FIG. 1 shows the preparation of a catalyst slurry containing crystalline titanium halide in a relatively inert hydrocarbon diluent selected from the group consisting of aliphatic, cycloaliphatic, aromatic hydrocarbons, their halogen derivatives and mixtures thereof in zone 1 entitled "Catalyst Slurry." The slurry contains from about 5 to about 95 percent by weight $TiX_n$ in hydrocarbons.

The mixture is stored under inert atmosphere such as dry nitrogen or dry argon to prevent degradation of the $TiX_n$ component. While maintaining a slurry of the titanium component and diluent, a portion of the slurry can be passed through a "Metering Zone" which places the titanium and the inert hydrocarbon diluent into a "Catalyst Activation Zone" in a measured amount. In the "Catalyst Activation Zone," the titanium component is treated with an ether activating agent. The mole ratio of the ether activating agent to mole of titanium can range from about 0.01 to about 10.0 moles, respectively. It is necessary to agitate the ether and titanium components prior to polymerization. During this period the catalyst is activated chemically and/or physically prior to polymerization. Contact time for the catalyst in the activation zone need only be that sufficient for activation of the titanium component and generally ranges from about 1 to about 10 minutes, with from 1 to about 5 minutes being preferred. The preferred slurry concentration in the "Catalyst Activation Zone" ranges from about 10 to about 50% by weight of titanium component in diluent. The preferred mole ratio of ether to titanium is from 0.4 to 0.7 moles.

After activation, the activated catalyst is discharged in its entirety into the reaction zone. Preferably, the reactor already contains the polymerizable olefin and the co-catalyst. Optionally, a diluent may be present. The polymerization is initiated by the simple introduction of the activated catalyst slurry containing the titanium and ether. It is preferred to contact the co-catalyst in the reactor in the presence of olefin rather than prior to introduction into the polymerization zone, since it has been surprisingly found that this feature provides superior activity and performance for the catalyst as compared combination prior to introduction.

Co-catalysts useful in the present invention are aluminum alkyl compounds or alkyl aluminum halide compounds. Representative examples of such materials are trimethylaluminum, triethylaluminum, tri-n-propylaluminum, tri-n-butylaluminum, triisobutylaluminum, tri-n-hexylaluminum, tri(2-methylpentyl) aluminum, tri-n-octylaluminum, diethylaluminum hydride, diisobutylaluminum hydride, diisopropylaluminum chloride, dimethylaluminum chloride, diethylaluminum chloride, diethylaluminum bromide, diethylaluminum iodide, di-n-propylaluminum chloride, di-n-butylaluminum chloride, diisobutylaluminum chloride, or mixtures of these.

The present invention is depicted and exemplified as a batch reaction. However, those skilled in this art will readily recognize that the slurry system described is extremely well suited for continuous polymerizations. In such a continuous polymerization system, the titanium catalyst would be continuously contacted with and activated by an ether in an activation vessel. The activation vessel would be maintained at a constant volume while a stream of the activated titanium/ether catalyst slurry is passed to the polymerization zone.

Japan Kokai No. 75156586 discloses a method of polymerizing propylene wherein an ether activating agent is added to an organoaluminum compound and olefin prior to inserting titanium. German Offenlegungsschrift No. 2810544 describes a method wherein titanium trichloride and an organoaluminum compound are treated with an alkylaluminum dihalide in butyl ether. Japan Kokai No. 78129195 shows the presence of aluminum containing compounds with titanium during the activation with ethers. However, these processes are not that described in the present invention.

U.S. Pat. No. 3,055,878 teaches the use of tertiary amines in preforming a catalyst by reacting said amines with a titanium trichloride. This amine activated titanium material is then added to an olefin and thereafter an organoaluminum material is added. However, this reference indicates the necessary time of the reaction or activation between the amine compound and the titanium compound is at least one hour and the process produces a crystalline product, not the non-crystalline hydrocarbon soluble materials of the present invention.

The present invention is more completely described with reference to the examples below wherein all parts are by millimoles unless otherwise specified. The examples are provided to illustrate the present invention and not to limit it.

GENERAL PROCEDURE

In examples 1 through 5 the same general procedure was followed. Dried and deoxygenated Molex raffinate solvent was placed into a clean and dry 1-quart bottle. Diethylaluminum chloride (DEAC) was added under an inert atmosphere of dry nitrogen.

COMPARATIVE EXAMPLE 1

Titanium trichloride, (Type 1.1 catalyst from Stauffer Chemical Company) was added under an inert atmosphere of dry nitrogen. The resulting mixture was placed into an agitated under bath (20±1° C.) and the catalyst components were allowed to interact for approximately ½ hour while stirring at 200 revolutions per minute (rpm). The polymerization was initiated by the addition of the olefin, octene-1. No ether activating agent was used.

DEAC/Titanium MMole Ratio: 3.3
Octene-1/Titanium MMole Ration: 342
Octene-1 charge: 12.6% (by weight)
Diluent: Molex raffinate The polymerization was terminated by adding 1.7 milliliters of methanol to deactivate the catalyst. The polymer mixture was stabilized using butylated hydroxy toluene (BHT) as an antioxidant.

To determine the weight percent polymer produced, 75 grams of the deactivated polymer mixture was poured into 400 ml of isopropanol with sufficient mixing to precipitate a viscous material containing poly(octene-1). The substance was washed with an additional 400 ml of isopropanol, filtered, and washed with 400 ml of methanol to remove catalyst residue. The poly(octene-1) was collected by vacuum filtration and dried in a vacuum oven overnight.

COMPARATIVE EXAMPLE 2

The general procedure was followed except that 0.56 millimole of di-n-butyl ether per millimole of titanium was added. The ether was delivered after charging the bottle with Molex raffinate and DEAC. The mixture was swirled and the solid $TiCl_3.AA$ catalyst was added in the dry box under an inert atmosphere of nitrogen. Ether activating agent was added directly to the reactor.

DEAC/Titanium MMole Ratio: 3.3
Ether/Titanium MMole Ratio: 0.56
Octene-1/Titanium MMole Ratio: 342
Octene-1 charge: 12.6% (by weight)
Diluent: Molex raffinate Octene-1 was used to initiate the polymerization.

COMPARATIVE EXAMPLE 3

Molex raffinate, DEAC, and di-n-butyl ether were added to a polymerization vessel as in comparative Example No. 2. A 30 weight percent slurry of $TiCl_3.AA$ from Stauffer Chemical company was prepared in Molex raffinate solvent. The Molex raffinate solvent was sparged with dry nitrogen, and dried over molecular sieves before using. The polymerization was initiated by the addition of the olefin, octene-1. No etheractivating agent was present in the slurry.

DEAC/Titanium MMole Ratio: 3.3
Ether/Titanium MMole Ratio: 0.56
Octene-1/Titanium MMole Ratio: 342
Octene-1 Charge: 12.6% (by weight)
Diluent: Molex raffinate The order of addition was: Molex raffinate, DEAC, $Bu_2O$, ($TiCl_3$/Molex raffinate) slurry, Octene-1.

EXAMPLE 4

A 30 weight percent slurry of $TiCl_3.AA$ in Molex raffinate was prepared as described in comparative Example No. 3. However, the di-n-butyl ether was not added to the DEAC. The ether was added to the slurry containing $TiCl_3.AA$ in Molex raffinate. The mmole ratio of ether to titanium was 0.56 as was in Examples 2 and 3. The following compounds were used in this experiment:

DEAC/Titanium MMole Ratio: 3.3
Ether/Titanium MMole Ratio: 0.56
Octene-1/Titanium MMole Ratio: 342
Octene-1 Charge: 12.6% (by weight)
Diluent: Molex raffinate The order of addition was: Molex raffinate, DEAC, ($TiCl_3$/Molex raffinate/$Bu_2O$) slurry, octene-1.

EXAMPLE 5

A 30 weight percent slurry was prepared as described in Example 4 except 0.11 millimoles of di-n-butyl ether per millimole of titanium was added to the slurry, and 0.45 millimoles of di-n-butyl ether per millimole of titanium was added to the polymerization vessel containing Molex raffinate and DEAC. The following components were used in this experiment:

DEAC/Titanium MMole Ratio: 3.3
Ether/Titanium MMole Ratio: 0.56
Octene-1/Titanium MMole Ratio: 342
Octene-1 Charge: 12.6% (by weight)
Diluent: Molex raffinate The order of addition in this experiment was: Molex raffinate, DEAC, $Bu_2O$, ($TiCl_3$/Molex raffinate/$Bu_2O$) slurry, octene-1. The polymerization was carried out as described previously.

The results of all reactions 1–5 with regard to catalytic activity and inherent viscosity of material produced is set forth in Table 1 below.

TABLE 1

| Example | Catalyst | Catalytic Activity (gm/gm Ti.Hr) | Inherent Viscosity $\gamma° = 300 \sec^{-1}$ (dl/gm) | % Drag Reduction at 10 PPM Polymer Concentration Initial | After 1.0 Min. |
|---|---|---|---|---|---|
| C-1 | Solid $TiCl_3.AA$ | 21.2 | 8.81 | 35.3 | 26.9 |
| C-2 | Solid $TiCl_3.AA$ | 62.8 | 11.2 | 47.3 | 37.6 |
| C-3 | 30% (by weight) Slurry of $TiCl_3$/Molex raffinate | 50.3 | 11.1 | 46.8 | 37.1 |
| 4 | 30% (by weight) Slurry of $TiCl_3$/Molex raffinate/$Bu_2O$ | 280.6 | 11.2 | 47.3 | 37.6 |
| 5 | 30% (by weight) Slurry of $TiCl_3$/Molex raffinate $Bu_2O$ | 107.7 | 10.3 | — | — |

In the table, percent drag reduction tests were carried out in a ⅜-inch inside diameter pipe viscometer, at a flow rate of 10 feet-per-second in diesel oil as the test fluid. In this test, diesel oil was continuously circulated from a 5-gallon storage tank through a Moyno progressive cavity pump to a 5-foot test section of ⅜-inch stainless steel precision tubing then returned to the 5-gallon tank.

The storage tank was maintained at a constant temperature of 74° F. and continuously stirred at low speed. The test fluid flows through a 1-foot calming section followed by a 4-foot test section where the pressure drop is measured. The pressure drop differences were measured, and the percent drag reduction (%DR) calculated by the equation $$\%DR = \frac{(\Delta P_{base} - \Delta P_{additive})}{\Delta P_{base}} \times 100$$

where $\Delta P_{base}$ is the initial baseline pressure of diesel oil without the additive and $\Delta P_{additive}$ is the pressure drop with the polymer solution.

The inherent viscosity set forth in Table 1 was determined for each polymer produced in LPA (low polynuclear aromatic solvent) at 77.5±0.5° F. A Cannon-Ubbelohde four bulb-shear dilution viscometer was used to make the determination. The inherent viscosities were calculated at a shear rate of 300 reciprocal seconds ($\gamma° = 300$ sec$^{-1}$). In the table, inherent viscosity (or logrithmic viscosity number) is defined as $\eta inh = \ln(\eta/\eta_s)/c$ where $\eta$ is the viscosity of the solution $\eta_s$ is the viscosity of pure solvent, and c is the concentration of the solution.

EXAMPLE 6

A 30 weight percent slurry of TiCl$_3$.AA in Molex raffinate was prepared which contained 9.04 millimoles of ether per millimole of titanium. The catalyst mixture was agitated then delivered to the polymerization reactor. The reactor contained inert hydrocarbon solvent (Molex raffinate) and DEAC. The mixture was stirred, and 12.5 weight percent octene-1 was added to initiate the polymerization. The mole ratio of polymerization components was 1368/13.4/9.04/1.0 (millimole octene/aluminum/ether/titanium). The resulting catalytic activity at 20°±1° C. was 41.7 grams poly(octene-1) produced per gram of titanium used per hour. The resulting polymer had an inherent viscosity of 9.9 dl/gm at 300 reciprocal seconds.

EXAMPLES 7–10

In the following examples the mole ratio of ether was varied from 1.13 to 4.52 millimoles per millimole of titanium. In these experiments a 30 weight percent slurry of TiCl$_3$.AA in Molex raffinate was prepared, and the ether was added. Polymerizations were charged with 12.6% octene-1. Ether was added to the slurry before delivering the slurry to the polymerization zone. The ratio of polymerization components (other than ether) in each experiment was 1368/13.4/1.0 (millimole octene/DEAC/titanium). Pertinent results and data on the effect of the ether variations are presented in Table 2.

TABLE 2

| | SLURRY SYSTEM WITH VARIOUS AMOUNTS OF ETHER | | |
|---|---|---|---|
| Example | Mmoles of Ether per Mmole of Ti | Catalytic Activity (gm/gm/Ti.Hr) | Inherent Viscosity at $\gamma° = 300$ sec$^{-1}$ (dl/gm) |
| 7 | 1.13 | 159 | 11.0 |
| 8 | 2.26 | 225 | 11.1 |
| 9 | 3.39 | 271 | 11.3 |
| 10 | 4.52 | 207 | 11.5 |

Examples 11 and 12 were carried out to demonstrate the effect of long contact times with the ether component. In these examples, a slurry of TiCl$_3$.AA (30% by weight in Molex raffinate) was prepared. To this mixture was added 1.7 mmoles of di-n-butyl ether per mmole of titanium. The slurry was agitated for 15 to 45 minutes prior to the introduction of the slurry into the polymerization zone. In Example 12 the slurry was prepared and stirred for 24 hours prior to introduction into the polymerization zone. In this example, the catalyst mixture formed a thick gum prior to introduction. It was difficult to deliver to the reactor zone and results indicated that catalytic retardation took place. p The olefin used in each experiment was octene-1 at 12.6% wt. The mmole ratio of catalytic components was 1200/11/1.7/1.0 (mmole octene/aluminum/ether/titanium). The results demonstrate that long contact times of the ether component with a transition metal catalyst are detrimental. The catalyst particle size appeared to be reduced to a state that resulted in catalytic retardation.

TABLE 3

| | | AGING EXPERIMENT | | |
|---|---|---|---|---|
| Example | Aging time | Description of Catalyst Particles in Slurry | Catalytic Activity (gm/gm Ti.Hr) | Inherent Viscosity $\gamma° = 300$ sec$^{-1}$ (dl/gm) |
| 11 | 14–45 minutes | Fine Catalyst Particles | 195 | 11.4 |
| 12 | 24 hours | Gum Formation | 78.1 | 11.2 |

Therefore, the preferred activation time of the ether component with the titanium component will depend upon the concentration of the ether and the amount of agitation. Generally, the ratio in moles of ether to titanium component ranges from about 0.01 to about 10.0 respectively; however, from about 0.01 to about 1 are preferred and from about 0.25 to about 0.75 is most preferred. Contact time can vary substantially, but normally will range from about a few minutes to about 60 minutes. At high concentrations of ether to titanium, that is, above about an equal molar basis, these materials should be left in contact longer than about 60 minutes when using intense agitation. When these precautions are observed, the process of the present invention provides a vastly improved process of obtaining an ultra-high molecular weight, non-crystalline, hydrocarbon soluble, drag reducing polymer.

While certain embodiments and details have been shown for the purpose of illustrating this invention, it will be apparent to those skilled in this art that various changes and modifications may be made herein without departing from the spirit or scope of the invention.

We claim:

1. A method for preparing non-crystalline, high molecular weight drag-reducing polymers comprising;
    (a) a transition metal catalyst slurry containing (1) at least 5% by weight, based on the total slurry of a crystalline titanium halide catalyst having the general formula $TiX_n$ where $n = 2.5$ to 3.0, and X is halogen, (2) a hydrocarbon inert diluent, and (3) from 0.01 to about 10.0 moles of an ether per mole of titanium together with, (b) a co-catalyst wherein (a) and (b) are placed in contact with (c) one or more α-monoolefinic hydrocarbons containing from 2 to 30 carbon atoms at temperatures of from about $-25°$ to about $100°$ C. and pressures of from about atmospheric to about 1000 psig to obtain an ultrahigh molecular weight polymer which is soluble in a hydrocarbon diluent, wherein (d) polymerization is ceased at a polymer content of 20% by weight or less based on total reactor content.

2. A method as described in claim 1 wherein the co-catalyst is an aluminum alkyl or an organo-aluminum halide.

3. A method as described in claim 2 wherein the ether is present in a mole ratio of from about 0.01 to about 1.0 based on the moles of crystalline-titanium chloride present.

4. A method as described in claim 3 wherein the hydrocarbon diluent is a material or mixture of materials selected from the group consisting of straight chain aliphatic compounds, branched hydrocarbons, alicyclic hydrocarbons or aromatic hydrocarbons.

5. A method as described in claim 1 wherein the $TiX_n$ component is $TiCl_3$.

6. A method as described in claim 1 wherein the $TiX_n$ component is $TiCl_3$ prepared by reducing $TiCl_4$ with aluminum.

7. A method as described in claim 4 wherein (1) a catalyst slurry of crystalline titanium chloride in an inert hydrocarbon diluent is prepared, and a portion of said slurry is (2) metered into a dispersion zone, where (3) a measured amount of ether is admixed with said slurry under agitation for a time sufficient to activate said titanium chloride, and (4) charging the activated slurry of (3) into a reaction zone, said zone containing at least one polymerizable monomer and co-catalyst selected from organo-aluminum or organo-aluminum halide.

8. A method as described in claim 7 wherein the ether is selected from the group consisting of di-n-butyl ether, benzyl ether, diethyl ether, diisopropyl ether, di-n-propyl ether, diphenyl ether, anisole, butyl phenyl ether, 1-ethoxynaphthalene, 1-methoxy-naphthalene, 2-methoxynaphthalene, tetrahydrofuran, 1,4-benzodioxane, 2,3-benzofuran, tert-butyl methyl ether, or mixtures of these.

9. A method as described in claim 7 wherein the $TiX_n$ component is $TiCl_3 \cdot AlCl_3$.

* * * * *

UNITED STATES PATENT AND TRADEMARK OFFICE
CERTIFICATE OF CORRECTION

PATENT NO. : 4,358,572

DATED : November 9, 1982

INVENTOR(S) : Mark P. Mack, Lewis B. Decker, Jr. and Adrian L. Wallace

It is certified that error appears in the above-identified patent and that said Letters Patent are hereby corrected as shown below:

Claim 9, last line, the formula $TiCl_3 \cdot AlCl_3$ should read -- $TiCl_3 \cdot 1/3\ AlCl_3$. --.

Signed and Sealed this

Fifteenth Day of February 1983

[SEAL]

Attest:

GERALD J. MOSSINGHOFF

Attesting Officer

Commissioner of Patents and Trademarks